United States Patent
Pieraccini et al.

(10) Patent No.: US 7,962,339 B2
(45) Date of Patent: Jun. 14, 2011

(54) METHOD FOR VARIABLE RESOLUTION AND ERROR CONTROL IN SPOKEN LANGUAGE UNDERSTANDING

(75) Inventors: Roberto Pieraccini, New York, NY (US); Krishna Dayanidhi, Jersey City, NJ (US)

(73) Assignee: SpeechCycle, Inc., New York, NY (US)

( * ) Notice: Subject to any disclaimer, the term of this patent is extended or adjusted under 35 U.S.C. 154(b) by 763 days.

(21) Appl. No.: 12/075,566

(22) Filed: Mar. 12, 2008

(65) Prior Publication Data

US 2008/0243505 A1 Oct. 2, 2008

(51) Int. Cl.
*G10L 15/00* (2006.01)

(52) U.S. Cl. .......... 704/251; 704/260; 704/257

(58) Field of Classification Search .......... 704/251, 704/260, 257
See application file for complete search history.

(56) References Cited

U.S. PATENT DOCUMENTS

| | | | | |
|---|---|---|---|---|
| 5,794,050 | A * | 8/1998 | Dahlgren et al. | 717/144 |
| 7,539,656 | B2 * | 5/2009 | Fratkina et al. | 706/45 |
| 7,571,098 | B1 * | 8/2009 | Gorin et al. | 704/257 |

\* cited by examiner

*Primary Examiner* — Vincent P Harper
(74) *Attorney, Agent, or Firm* — Frommer Lawrence & Haug LLP; William S. Frommer

(57) ABSTRACT

A method for variable resolution and error control in spoken language understanding (SLU) allows arranging the categories of the SLU into a hierarchy of different levels of specificity. The pre-determined hierarchy is used to identify different types of errors such as high-cost errors and low-cost errors and trade, if necessary, high cost errors for low cost errors.

3 Claims, 1 Drawing Sheet

METHOD FOR VARIABLE RESOLUTION AND ERROR CONTROL IN SPOKEN LANGUAGE UNDERSTANDING

BACKGROUND OF THE INVENTION

Spoken Language Understanding (SLU) is an existing technology that enables a variety of applications, mostly in the field of telephony customer care automation. Call routing, among others, is one of the examples that addresses users who contact a telephone call center and need to be routed to the appropriate agent to receive a particular service. Callers are greeted with an open prompt that invites them to speak the reason for their call in their own words. SLU technology is used for performing an automatic mapping of the spoken utterance to one of a number of possible call-reasons. SLU is also used in more complex applications, such as technical support, where users call to solve a problem they are experiencing with a service or an appliance. Automated technical support systems need first to identify the problem, or the symptom of the problem the caller is experiencing. In this context, SLU is used to map callers' utterances to symptoms in order to successfully proceed to the correct resolution of the problem.

In general SLU performs a mapping between input utterances and a number of categories defined a priori. State-of-the-art technology allows performing the mapping either by handwritten rules represented in the form of grammars or, most effectively, by using statistical machine learning algorithms. With the latter, a set of training utterances is collected, transcribed, and annotated with the true category to which they belong. Machine learning algorithms allow training an automatic classifier on the corpus of annotated utterances. The classifier can then be used to assign any input utterance to one of the pre-defined categories which have been used to annotate the training utterances.

The issue with certain applications of SLU is that the defined categories may have different levels of resolution, or specificity, that are adequate for routing a call to be handled by a live agent but insufficient for calls that need to be handled by a machine. The following are examples of callers' utterances in the domain of technical support for cable TV service in response to a request such as "Please say the reason you are calling" played immediately after callers reach an automated technical support number:

1. I have a technical problem with the cable TV service.
2. I am experiencing a problem with ordering.
3. I would like to order a movie on demand, but I have a problem.
4. I get an error code on the TV while trying to order a movie on demand.
5. When I order a movie on demand it asks for a PIN, which I don't have.

The first utterance is vague, and one cannot tell which type of problem the caller is experiencing—it could be a problem with picture quality, movies on demand, pay-per-view, or any other of the many problems one can experience with cable TV service. The utterance in the second example is more specific. In fact the caller states clearly that he has a problem with ordering a show or a movie, but it is not clear which type of problem. Similarly it is not clear whether he has a problem with ordering an on-demand or pay-per-view event, which are two different ways to order movies or shows on cable TV. The third example is more specific, and states that the problem is related to on-demand ordering, but does not say which type of problem it is. Finally the other examples are more specific and completely describe the problem.

It is clear from the above examples that a well designed voice user interface should follow up with a different dialog for each one of the above utterances. Existing SLU systems use a number of well defined categories, which do not present variable levels of specificity, and thus do not allow treatment of vague utterances in a different way than more specific ones.

Another drawback of the existing SLU technology is that it does not take advantage of the intrinsic hierarchy of categories in order to control the classification error. In other words errors made at different levels of the hierarchy may have different impact with respect to the final outcome of the interaction. For instance, a substitution error between a specific category and a less specific one in the same hierarchy is less severe than an error between categories at the same level of specificity or errors between categories in different hierarchical paths.

SUMMARY OF THE INVENTION

Therefore, a need exists for a technique that includes variable levels of specificity and takes advantage of the intrinsic hierarchy of categories in order to minimize classification errors.

Accordingly, the present invention allows arranging spoken language understanding (SLU) categories in a hierarchy that describes different levels of specificity, identifying different types of errors which can occur in a SLU system, including high-cost errors and low-cost errors, and trading high-cost errors for low cost-errors by hypothesizing the parent category in the hierarchy when the recognized category has a low confidence level.

Still other objects and advantages of the invention will in part be obvious and will in part be apparent from the specification and the drawings.

BRIEF DESCRIPTION OF THE DRAWING

For a more complete understanding of the invention, reference is made to the following description and accompanying drawing, in which.

DETAILED DESCRIPTION OF THE PREFERRED EMBODIMENTS

Figure 1:
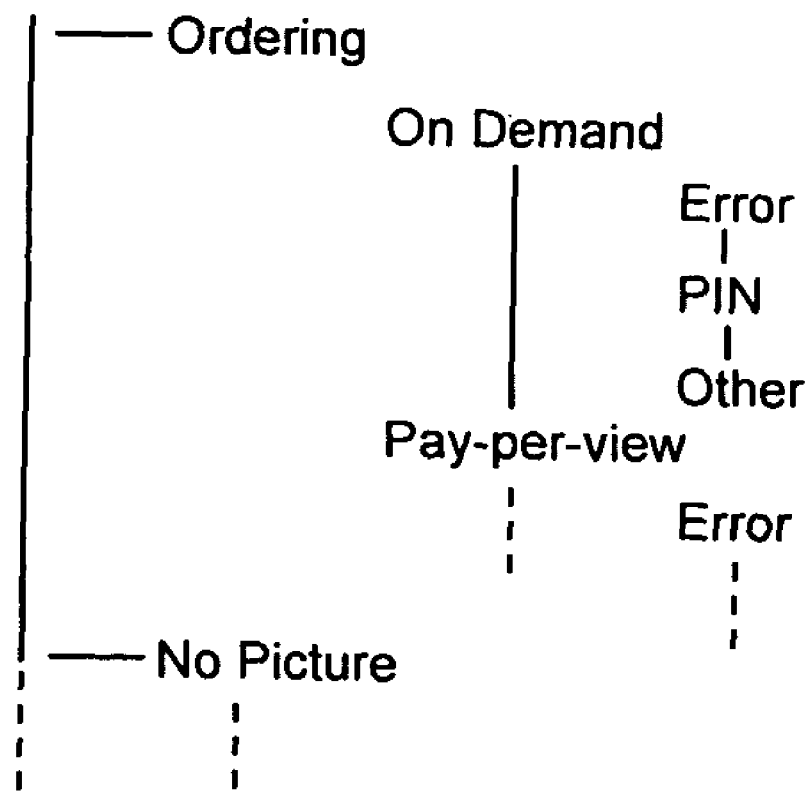
FIG. 1 is a diagram showing an example of SLU hierarchy in accordance with the teachings of the present invention.

The preferred embodiments of the present invention will be described with reference to the accompanying drawing.

The present invention allows arranging the categories of the SLU into a hierarchy of different levels of specificity. For instance, following the above examples, one can arrange the different categories of problems in a hierarchal tree as shown by the diagram of FIG. 1.

The root of the tree (e.g. TV-problem) has a lower level of specificity than the nodes below it (e.g. TV-Problem.Ordering.On-demand). Moving on any arbitrary path from the root towards the leaves of the tree one finds increasingly more specific categories.

Once the categories are established and well defined, the corresponding SLU can be trained using existing methods known to those of ordinary skill in the art. Typically, a number of training example sentences are assigned to each one of the categories in the hierarchy in a process called annotation, and a statistical classifier based on existing algorithms is trained using available statistical methods. The statistical classifier assigns one of the categories predetermined by the hierarchy to any new sentence.

Since any statistical classifier is prone to errors, the predetermined hierarchy may be used to trade, if necessary, high cost errors for low cost errors.

A high-cost-error is an error occurring between two categories which are not on the same path (from the root to the leaves, or from less to more specific hierarchies) or between categories which are in the same path, but the true category is at a higher level in the hierarchy (i.e. it is less specific). For instance, if the true category—i.e. the category spoken by the user—is TV-Problem.Ordering and the category recognized by the SLU algorithm is TV-Problem.No-Picture, the two categories are not part of the same hierarchical path. In this case the error (a high-cost error) cannot be easily recovered by a follow-up dialog since the system assumes the problem is with "no picture", which is on a different path than the true problem. Similarly, if the true category is TV-Problem.Ordering and the recognized category is TV-Problem.Ordering.On-demand.Error, this is again to be considered a high-cost error, since the two categories are on the same path (i.e. TV-Problem.Ordering is part of the TV-Problem.Ordering.On-demand.Error path in the hierarchy tree), but the true category has a lower level of specificity (i.e. it is higher in the hierarchy tree). In fact, also in this case, the error is harder to correct in a follow-up dialog, since the system already assumes a more specific category than the actual one.

A low-cost-error is an error occurring between two categories which are on the same hierarchical path and the true category has a higher level of specificity than the recognized one, such as, for example, if the true category is TV-Problem.Ordering.On-demand.Error and the recognized category is TV-Problem.Ordering. In this case the error can be corrected with a follow-up dialog by asking the user to select a category from all the categories that have a higher level of specificity than the recognized one, which include the true category.

Most known SLU algorithms include a measure of confidence which can be used to make decisions, at the level of the application, on whether the recognized category should be accepted and used by the system. When the confidence level of the SLU algorithm is lower than a predetermined threshold value, it is better to reject or to confirm with the user. Rejection of SLU hypotheses can be annoying to the user, since he has to repeat what he just said, or go through a lengthy dialog in order to allow the system to identify the category of the utterance. Similarly, confirmation of a wrongly recognized category can be annoying to users. Accordingly, the following algorithm has been developed: when any available confidence measure detects potential situations of errors (i.e., the confidence level is lower than a predetermined threshold value) the system—rather than rejecting or confirming the wrong hypothesis—outputs the parent category, i.e. the category with a level of specificity immediately lower than the one recognized (i.e. higher in the hierarchy tree). For instance, if the recognized category is Problem.Ordering.On-demand.Error and the confidence level is low, the system outputs the parent category, which is Problem.Ordering.On-demand. Subsequently, the system asks the user to select from all of the categories or problems which have an immediately higher specificity that the parent category (i.e., all the children categories). The system then awaits the user's response selecting the problem or category relevant to the user. By doing so one trades potential high cost errors for low cost errors and increases the usability of the application.

The rationale behind this algorithm is that by using a less specific category when the confidence level is low, the likelihood of it being the wrong parent category is very small, so a follow-up disambiguation can bring the interaction back on course.

While a preferred embodiment of the present invention has been described using specific terms, such description is for illustrative purposes only, and it is to be understood that changes and variations may be made without departing from the spirit or scope of the present invention.

What is claimed is:

1. A method of resolving errors in an automated spoken language recognition system comprising the steps of:
   providing a hierarchical set of predetermined spoken language categories arranged in respective paths of progressively increasing specificity, each path associated with a separate category;
   receiving voice utterances from a speaker;
   recognizing a received voice utterance and classifying the recognized voice utterance in one of said predetermined spoken language categories;
   determining, when the speaker identifies an error between his voice utterance and said classified category, whether said error is a high-cost-error or a low-cost-error; and
   instructing the speaker to select a category of lesser specificity and superior to said classified category in said hierarchical path if said error is determined to be a low-cost-error.

2. The method of claim 1, wherein a low-cost-error is an error between a superior category and an inferior category in the same hierarchical path.

3. A method of resolving errors in an automated spoken language recognition system comprising the steps of:
   providing a hierarchical set of predetermined spoken language categories arranged in respective paths of progressively increasing specificity, each path associated with a separate category;
   receiving voice utterances from a speaker;
   recognizing a received voice utterance and preliminarily assigning the recognized voice utterance to one of said predetermined spoken language categories;
   assigning a confidence level to the recognition of said received voice utterance;
   sensing when said confidence level is below a predetermined threshold;
   classifying the recognized voice utterance in a spoken language category of immediately lesser specificity than the preliminarily assigned category; and
   instructing the speaker to select a category of lesser specificity and superior to said classified category in said hierarchical set.

* * * * *

UNITED STATES PATENT AND TRADEMARK OFFICE
CERTIFICATE OF CORRECTION

PATENT NO. : 7,962,339 B2  
APPLICATION NO. : 12/075566  
DATED : June 14, 2011  
INVENTOR(S) : Pieraccini et al.

Page 1 of 1

It is certified that error appears in the above-identified patent and that said Letters Patent is hereby corrected as shown below:

Title Page Add

Item

-- (30)      U.S. Application Priority Data

60/906,948      March 14, 2007

Signed and Sealed this

Twenty-first Day of February, 2012

David J. Kappos  
*Director of the United States Patent and Trademark Office*